US012602919B2

(12) United States Patent
Abati et al.

(10) Patent No.: US 12,602,919 B2
(45) Date of Patent: Apr. 14, 2026

(54) GENERATIVE DATA AUGMENTATION WITH TASK LOSS GUIDED FINE-TUNING

(71) Applicant: QUALCOMM Incorporated, San Diego, CA (US)

(72) Inventors: Davide Abati, Amsterdam (NL); Amirhossein Habibian, Amsterdam (NL); Auke Joris Wiggers, Amsterdam (NL); Jens Petersen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 18/506,018

(22) Filed: Nov. 9, 2023

(65) Prior Publication Data

US 2025/0157207 A1     May 15, 2025

(51) Int. Cl.
*G06V 10/82*          (2022.01)
*G06V 10/774*         (2022.01)

(52) U.S. Cl.
CPC ............ *G06V 10/82* (2022.01); *G06V 10/774* (2022.01)

(58) Field of Classification Search
None
See application file for complete search history.

(56) References Cited

U.S. PATENT DOCUMENTS

2021/0358115 A1 * 11/2021 Hever .................... G06N 3/094
2023/0334834 A1    10/2023 Bai et al.

OTHER PUBLICATIONS

Antoniou A., et al., "Data Augmentation Generative Adversarial Networks", arXiv:1711.04340v3 [stat.ML], Mar. 21, 2018, pp. 1-14.
Sandfort V., et al., "Data Augmentation Using Generative Adversarial Networks (CycleGAN) to Improve Generalizability in CT Segmentation Tasks", Scientific Reports, Nov. 15, 2019, pp. 1-9.
Shin H-C., et al., "Medical Image Synthesis for Data Augmentation and Anonymization using Generative Adversarial Networks", arXiv: 1807.10225v2 [cs.CV], Sep. 13, 2018, 11 Pages.
Trabucco B., et al., "Effective Data Augmentation With Diffusion Models", arXiv:2302.07944v2 [cs.CV], May 25, 2023, pp. 1-22.
Zhao H., et al., "X-Paste: Revisiting Scalable Copy-Paste for Instance Segmentation using CLIP and StableDiffusion", arXiv:2212. 03863v2 [cs.CV], Proceedings of the 40th International Conference on Machine Learning, May 31, 2023, pp. 1-12.
Dhariwal, et al., "Diffusion Models Beat GANs on Image Synthesis", arXiv:2105.05233v4 [cs.LG], May 11, 2021, pp. 1-44.
Hemmat, et al., "Feedback-Guided Data Synthesis for Imbalanced Classification", arXiv:2310.00158v1 [cs.CV], Cornell University Library, 201 Olin Library Cornell University Ithaca, NY 14853, Sep. 29, 2023, pp. 1-24.
International Search Report And Written Opinion—PCT/US2024/ 044486—ISA/EPO—Jan. 13, 2025.

* cited by examiner

*Primary Examiner* — Leon Flores
(74) *Attorney, Agent, or Firm* — Seyfarth Shaw LLP

(57) ABSTRACT

A method includes generating a synthetic dataset with a generative model. The method also includes tuning the generative model based on feedback from a task network that receives the synthetic dataset as input. The task network may perform image recognition. The synthetic dataset may be generated based on a set of classes and labels of the classes. The method may iteratively generate the synthetic dataset and tune the generative model, based on feedback from the task network.

16 Claims, 10 Drawing Sheets

202

FULLY CONNECTED

204

LOCALLY CONNECTED

210

212

214

216

206

CONVOLUTIONAL

208

350

INPUT DATA — 352

354A

CONV — 356

LNorm — 358

MAX POOL — 360

354B

CONV — 356

LNorm — 358

MAX POOL — 360

FC1 — 362

FC2 — 362

LR — 364

CLASSIFICATION SCORE — 366

```
·Input:
    ·Image x, Class y and derived prompt p (e.g. "A clear image of a single <y>"
    ·Pretrained: LDM, T z_img = LDM.image_encoder (x)
z_text = LDM.text_encoder (p)
t ~ [0, T]
noise ~ LDM.noise_scheduler(t)
z_noisy = z_img + noise
noise_pred = LDM.unet_denoise (z_noisy, z_text, t)
LDM_loss = MSE(noise, noise_pred)

z_denoised = LDM.noise_scheduler(z_noisy, noise_pred, t)
x' = LDM.vae_decoder(z_denoised)
y' = T(x') // feed task network
task_loss = cross_entropy(y', y) // compute task loss on generated image
```

GENERATE A SYNTHETIC DATASET WITH A GENERATIVE MODEL

904

TUNE THE GENERATIVE MODEL BASED ON FEEDBACK FROM A TASK NETWORK THAT RECEIVES THE SYNTHETIC DATASET AS INPUT

GENERATIVE DATA AUGMENTATION WITH TASK LOSS GUIDED FINE-TUNING

FIELD OF THE DISCLOSURE

Aspects of the present disclosure generally relate to computer vision, and more specifically to image recognition based on generative data augmentation with task loss guided fine-tuning.

BACKGROUND

Artificial neural networks may comprise interconnected groups of artificial neurons (e.g., neuron models). The artificial neural network (ANN) may be a computational device or be represented as a method to be performed by a computational device. Convolutional neural networks (CNNs) are a type of feed-forward ANN. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Computer vision includes image recognition tasks, such as classification, segmentation, and object recognition, in video and images. Image recognition by machine learning models is becoming increasingly important. Applications for image recognition include automotive use cases, as well as extended reality (XR) applications. It would be desirable to improve image recognition techniques.

SUMMARY

Aspects of the present disclosure are directed to an apparatus. The apparatus has at least one memory storing instructions and one or more processors coupled to the at least one memory. The processor(s) is configured to instruct the apparatus to generate a synthetic dataset with a generative model. The processor(s) is also configured to instruct the apparatus to tune the generative model based on feedback from a task network that receives the synthetic dataset as input.

In aspects of the present disclosure, a method includes generating a synthetic dataset with a generative model. The method also includes tuning the generative model based on feedback from a task network that receives the synthetic dataset as input.

In other aspects of the present disclosure, a non-transitory computer-readable medium with program code recorded thereon is disclosed. The program code is executed by at least one processor and includes program code to generate a synthetic dataset with a generative model. The program code also includes program code to tune the generative model based on feedback from a task network that receives the synthetic dataset as input.

Other aspects of the present disclosure are directed to an apparatus. The apparatus includes means for generating a synthetic dataset with a generative model. The apparatus also includes means for tuning the generative model based on feedback from a task network that receives the synthetic dataset as input.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7 illustrates pseudocode for generative data augmentation with task loss guided fine-tuning, in accordance with various aspects of the present disclosure.

DETAILED DESCRIPTION

Figure 1:
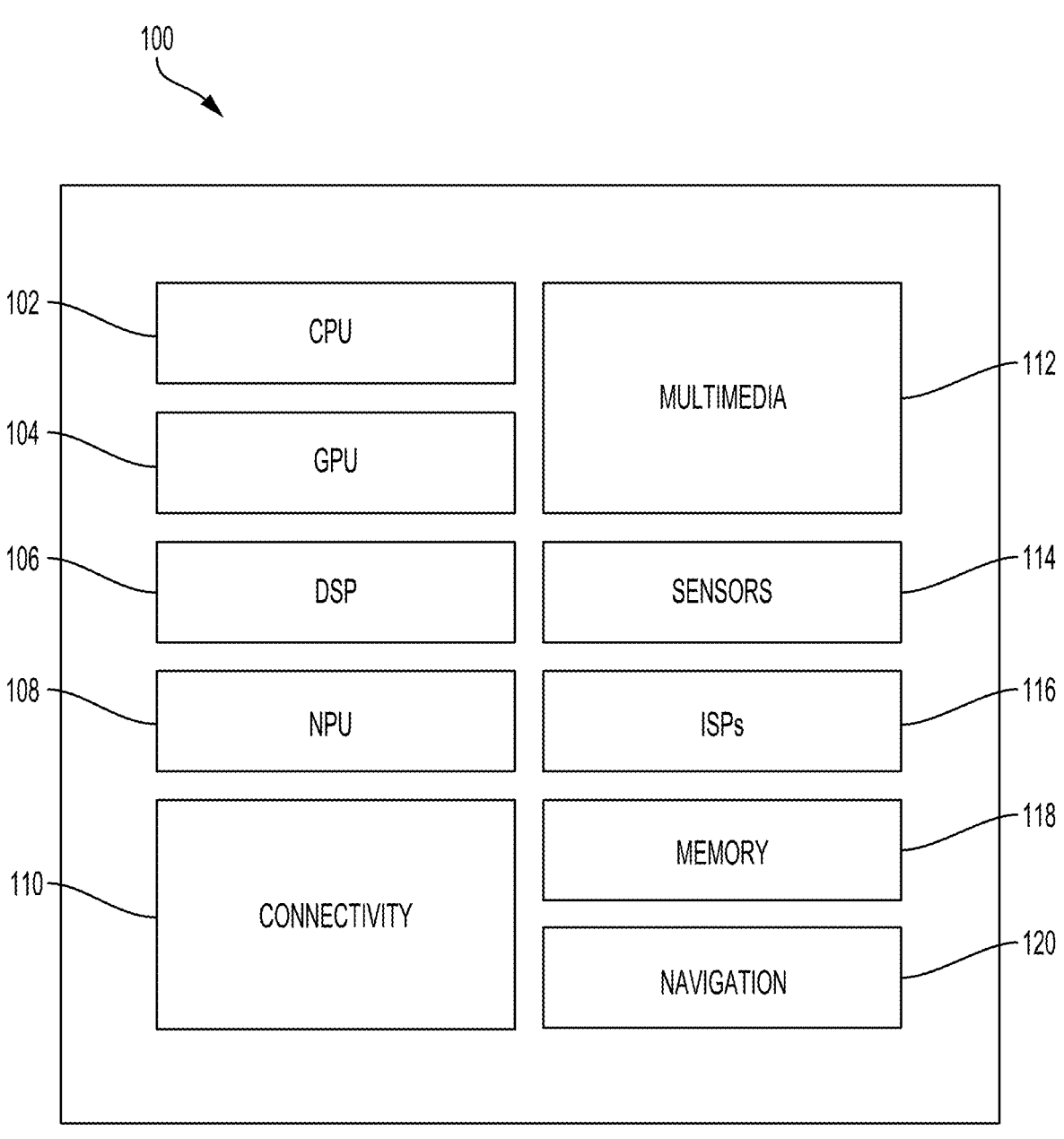
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Image recognition by machine learning models is becoming increasingly important. For example, self-driving vehicles use image recognition to detect and segment vulnerable road users (VRUs). In extended reality (XR) applications, image recognition may be used for human detection and segmentation tasks.

Long tail image recognition may employ generative data augmentation. Naively using foundation generative models trained on very large datasets is prone to error, however, especially if the domain of interest is specific.

Because computer vision models are growing in size, more data is needed to train these models. Thus, synthetic data may be used to train computer vision models. A pretrained generative model (e.g., a latent diffusion model (LDM)) may generate synthetic data for training a computer vision model. If the quality of the synthetic data is poor, however, the performance of the task network may be poor. Poor performance may occur because the generative model and task network do not communicate with each other. Consequently, there is no incentive for the generated images (e.g., synthetic data) to be helpful for the task network.

Aspects of the present disclosure allow a task network to intervene in a data generation process. Task loss guided fine-tuning enables a generative model to generate samples that may be easily recognizable by the task network, which has been pretrained on real data. The use of the generated samples in conjunction with augmentation learning may improve performance of the task network on real samples.

In some aspects, the generative model is fine-tuned by using performance of the task network as an objective. As a result, the generative model is able to generate data that is more useful for the task network.

In other aspects, augmentation learning is performed. In augmentation learning, consideration is given as to how effectively the generated data improves the task network on real data. In these aspects, stochastic gradient descent is performed on the task network with a task loss based on augmented images to obtain updated parameters (e.g., weights) for the task network, resulting in an updated (or new) task network. The task loss is then computed for the new model based on the original images. This task loss is back propagated to the generative model to obtain updated parameters for an updated generative model. The updated generative model is then able to transform real images into improved synthetic data to provide improved gradients for the task network parameters. The process repeats until performance of the task network on the real images is sufficiently improved.

Particular aspects of the subject matter described in this disclosure can be implemented to realize one or more of the following potential advantages. In some examples, the described techniques (e.g., generating a synthetic dataset with a generative model and tuning the generative model based on feedback from a task network) may improve an accuracy of the task network for various tasks, such as image recognition.

FIG. 1 illustrates an example implementation of a system-on-a-chip (SOC) 100, which may include a central processing unit (CPU) 102 or a multi-core CPU configured for fine-tuning generative data augmentation models. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to generate a synthetic dataset with a generative model. The general-purpose processor 102 may also include code to tune the generative model based on feedback from a task network that receives the synthetic dataset as input.

According to aspects of the present disclosure, an apparatus includes means for generating, means for tuning, means for interactively generating, means for obtaining, means for calculating, means for back propagating, means for retaining, and means for updating. In one configuration, means for generating, means for tuning, means for interactively generating, means for obtaining, means for calculating, means for back propagating, means for retaining, and means for updating may be the CPU, GPU, DSP, and/or NPU, as shown in FIGS. 1 and/or 4. In other aspects, the aforementioned means may be any structure or any material configured to perform the functions recited by the afore-mentioned means.

Deep learning architectures may perform an object rec-ognition task by learning to represent inputs at successively higher levels of abstraction in each layer, thereby building up a useful feature representation of the input data. In this way, deep learning addresses a major bottleneck of tradi-tional machine learning. Prior to the advent of deep learning, a machine learning approach to an object recognition prob-lem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engi-neers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if pre-sented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, informa-tion is passed from lower to higher layers, with each neuron in a given layer communicating to neurons in higher layers. A hierarchical representation may be built up in successive layers of a feed-forward network, as described above. Neu-ral networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
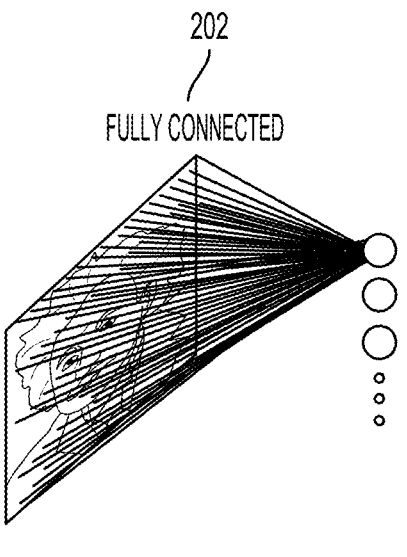
FIGS. 2A, 2B, and 2C are diagrams illustrating a neural network in accordance with various aspects of the present disclosure.
Figure 2B:
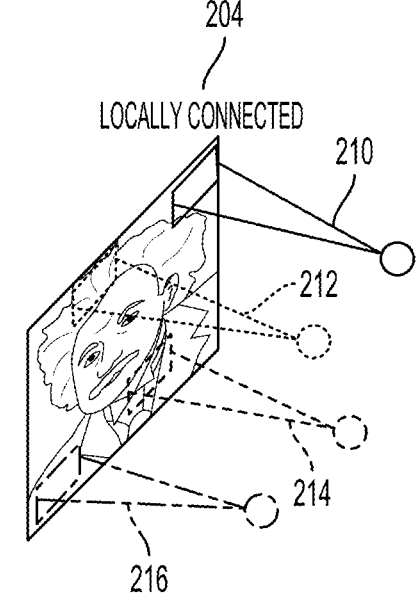

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be con-figured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the prop-erties of a restricted portion of the total input to the network.

Figure 2C:
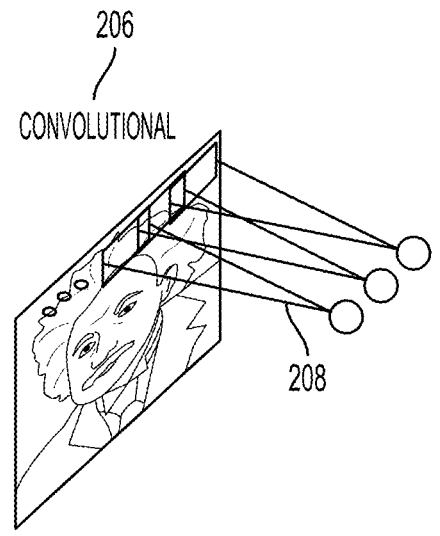

One example of a locally connected neural network is a convolutional neural network. FIG. 2C illustrates an example of a convolutional neural network 206. The con-volutional neural network 206 may be configured such that the connection strengths associated with the inputs for each neuron in the second layer are shared (e.g., 208). Convolu-tional neural networks may be well suited to problems in which the spatial location of inputs is meaningful.

Figure 2D:
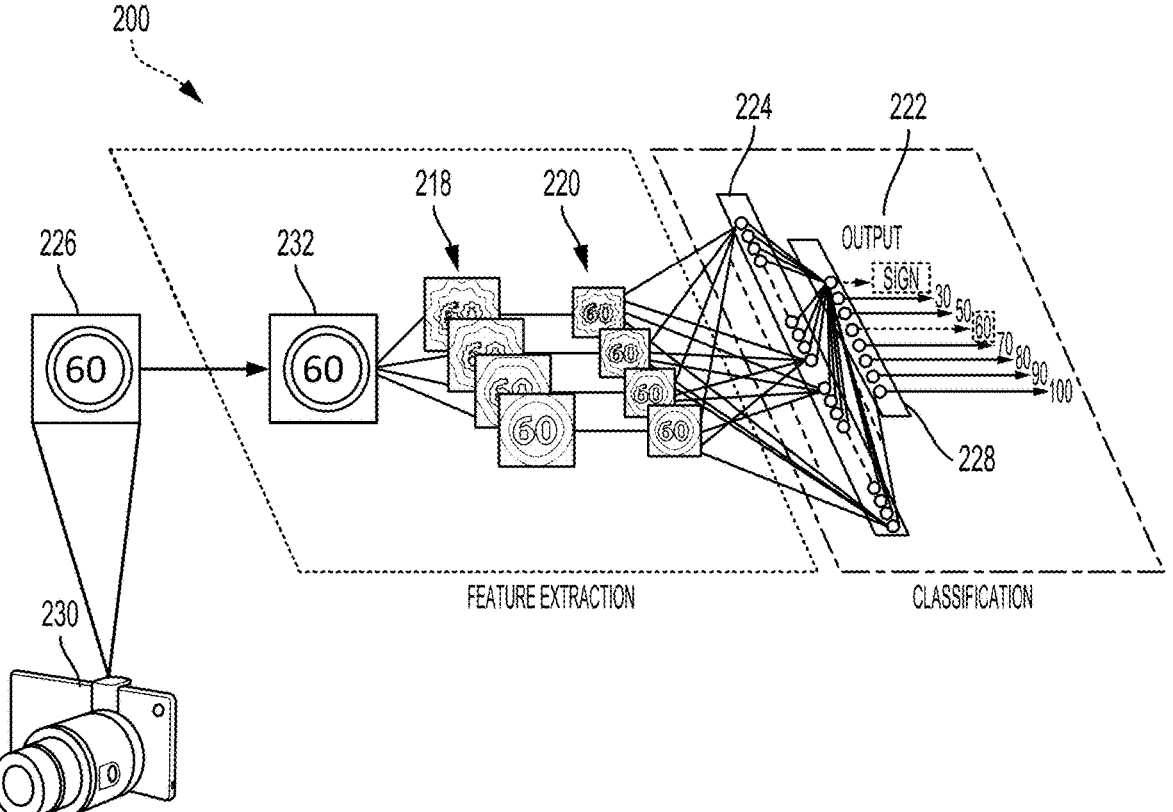
FIG. 2D is a diagram illustrating an exemplary deep convolutional network (DCN) in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to gen-erate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images (e.g., the speed limit sign of the image 226) and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training datasets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
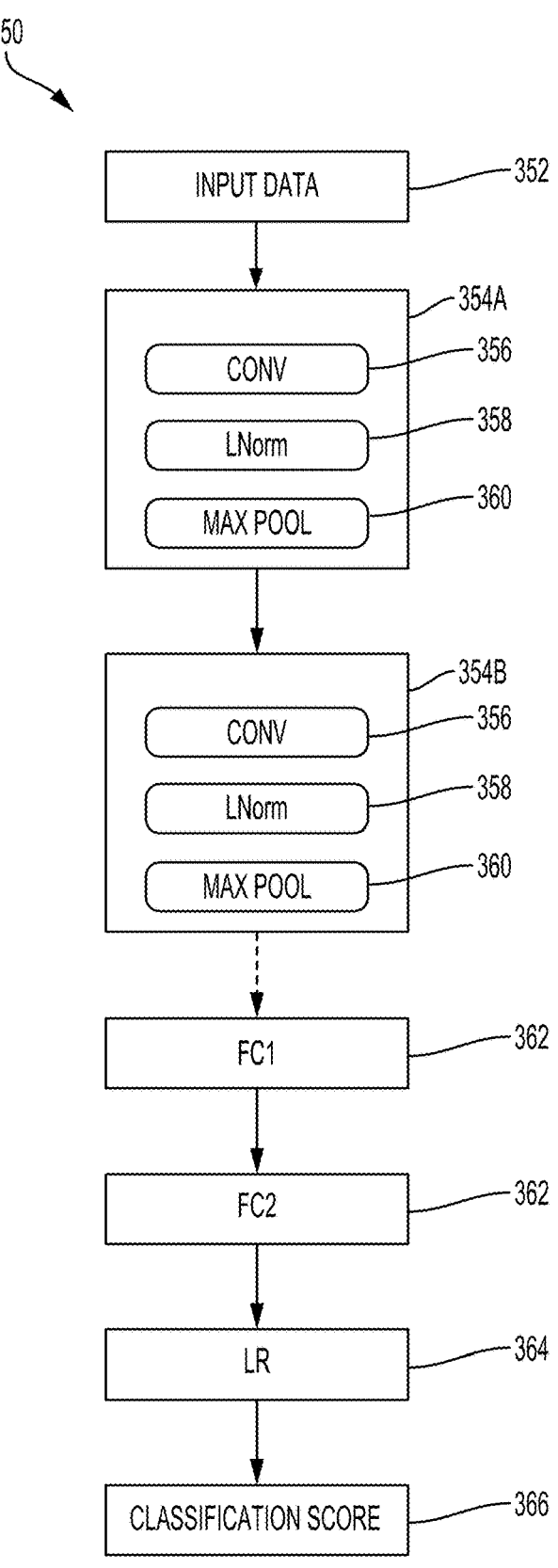
FIG. 3 is a block diagram illustrating an exemplary deep convolutional network (DCN) in accordance with various aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
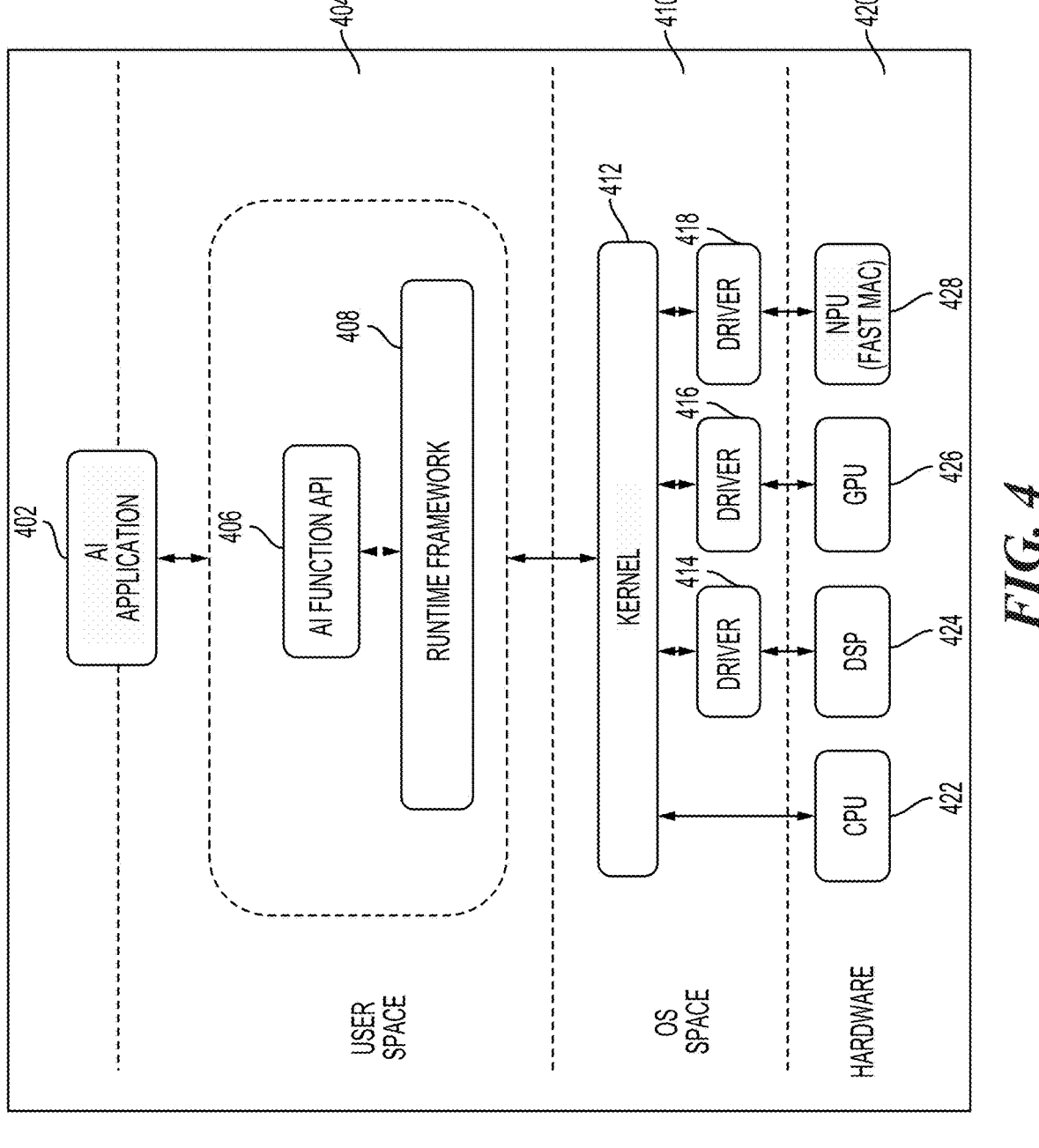
FIG. 4 is a block diagram illustrating an exemplary software architecture that may modularize artificial intelligence (AI) functions, in accordance with various aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SOC 100 of FIG. 1) to generate a synthetic dataset with a generative model for an AI application 402, according to aspects of the present disclosure. Using the architecture 400, applications may also be designed that may cause various processing blocks of an SOC 420 (for example a CPU 422, a DSP 424, a GPU 426 and/or an NPU 428) (which may be similar to SoC 100 of FIG. 1) to tune the generative model based on feedback from a task network that receives the synthetic dataset as input for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

The run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Image recognition by machine learning models is becoming increasingly important. For example, self-driving vehicles may use image recognition to detect and segment vulnerable road users (VRUs). In one example, accurate image recognition may prevent unnecessary braking. In extended reality (XR) applications, image recognition may be used for human detection and segmentation tasks. Moreover, image recognition may improve occlusion rendering.

Long tail image recognition may employ generative data augmentation. Long tail distributions refer to distributions where some class types appear frequently (e.g., 80% of the time) and other class types appear infrequently (e.g., 20% of the time). Generative data augmentation (GDA) refers to techniques for generating synthetic data, for example, for training computer vision models. Naively using foundation generative models trained on very large datasets is prone to failures, however, especially if the domain of interest is specific.

Recent increases in the fidelity of generative latent diffusion models (LDMs) have led to improved data quality for generated data. Text2Image, which generates an image based on text, is an example task to be solved by an LDM. Image2Image, which generates an image from an input image, is another example task to be solved by an LDM. Video2Video, which generates a video from an input video, is still another example task to be solved by an LDM. Because computer vision models are growing in size, more data is needed to train these models. Thus, synthetic data may be used to train computer vision models.

Figure 5:
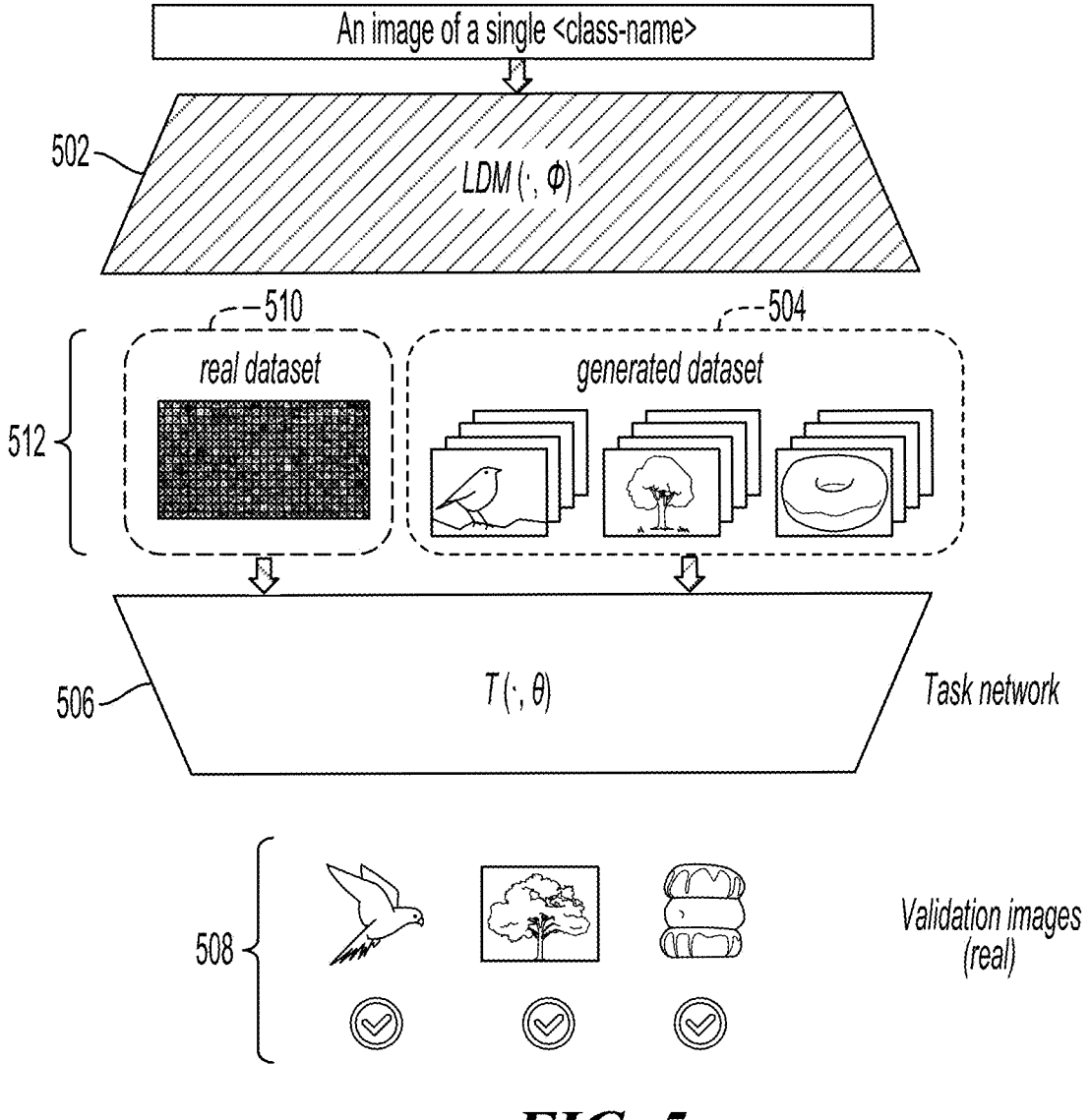
FIG. 5 is a block diagram illustrating generative data augmentation.

FIG. 5 is a block diagram illustrating an example of generative data augmentation. In the example of FIG. 5, a pretrained generative model (e.g., an LDM) 502, having a set of model parameters (e.g., weights) $\phi$, receives a text-based input of a single class type having a class name (e.g., "An image of a single <class-name>"). For instance, the generative model 502 may receive as input the text "Image of a single cat" to which the generative model 502 outputs an actual image of a cat. This is the process of sampling image and class (x and y) from a text2image LDM.

The generative model 502 is pretrained and generates synthetic data 504, without seeing the real images that train the task network 506. Synthetic data may also be referred to a generated dataset. A task network T 506 with parameters (e.g., weights) $\theta$ performs image recognition 508, such as classification, detection, and/or segmentation, based on input data 512, which includes a real dataset 510 and the synthetic data 504. The task network 506 may be fine-tuned based on the synthetic data 504. If the quality of the synthetic data 504 is poor, the performance of the task network 506 may be poor. Poor performance of the task network 506 may be improved, in some cases, by retraining the task network 506 on a mixture of real and synthetic datasets. The real images 510 are used to train the task network 506, alongside the generated images 504.

Poor performance from the training process described with reference to FIG. 5 may occur because the generative model 502 and task network 506 do not communicate with each other. Consequently, there is no incentive for the generated images (e.g., synthetic data 504) to be helpful for the task network 506. The generative model 502 is unaware of which classes the task network 506 is having difficulty with. Additionally, the generative model 502 does not see the data used to train the task network 506.

Aspects of the present disclosure allow a task network to intervene in a data generation process. Task loss guided fine-tuning enables a generative model to generate samples that may be easily recognizable by the task network, which has been pretrained on real data. The use of the generated samples in conjunction with augmentation learning may improve performance of the task network on real samples.

Figure 6:
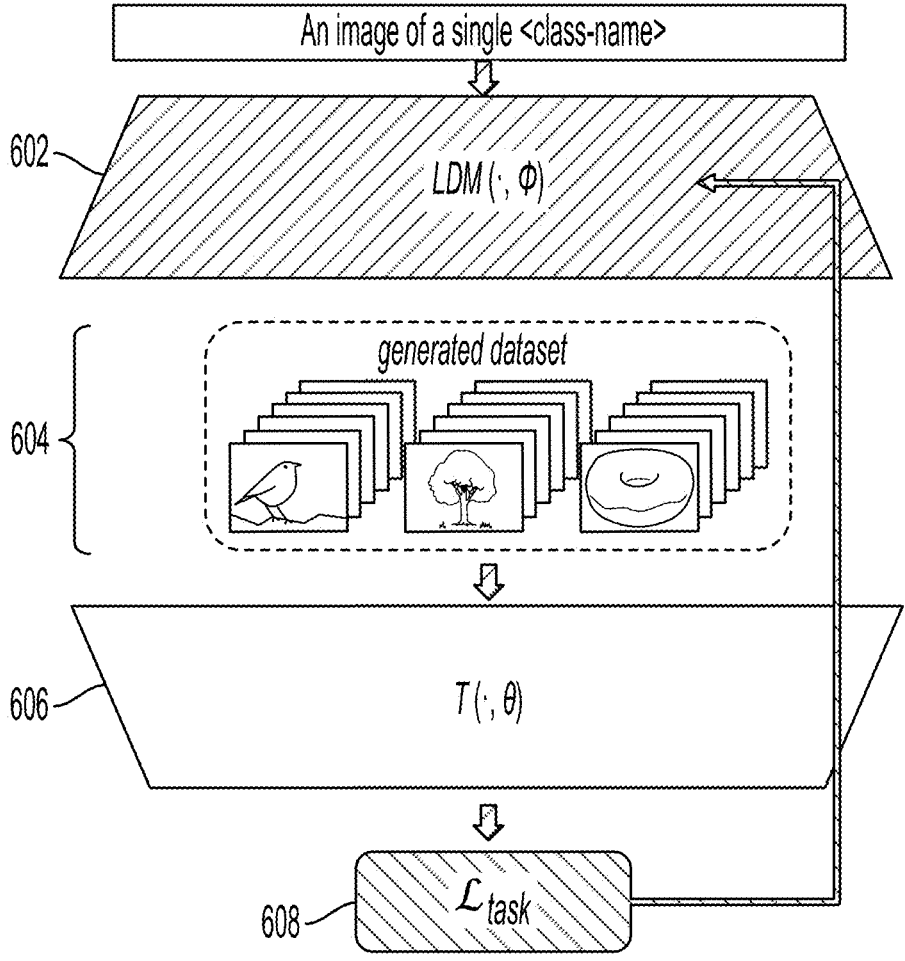
FIG. 6 is a block diagram illustrating an example of generative data augmentation with task loss guided fine-tuning, in accordance with various aspects of the present disclosure.

FIG. 6 is a block diagram illustrating an example of generative data augmentation with task loss guided fine-tuning, in accordance with various aspects of the present disclosure. In the example of FIG. 6, a pretrained generative model (e.g., an LDM) 602, having a set of model parameters (e.g., weights) $\phi$, generates real images of a single class type x and a class name y based on text input (e.g., "An image of a single <class-name>") to the generative model 602.

In other words, x, y~LDM (•, Ø). The generative model 602 is pretrained on another dataset, not shown in FIG. 6. The generative model 602 generates synthetic data 604 $x, y$ from scratch. A pretrained task network T 606 with parameters θ receives the generated dataset (e.g., synthetic data 604) and performs a task, such as image recognition (e.g., classification, detection, segmentation) based on the synthetic data 604. A loss $\mathcal{L}_{task}$ 608 of the task network 606 based on the synthetic data 604 is calculated.

Rather than optimizing parameters θ of the task network 606 to better fit the synthetic data 604, in the example of FIG. 6, the loss $\mathcal{L}_{task}$ 608 is back propagated to the generative model 602. The back propagation encourages the generative model 602 to generate samples familiar to the task network 606. In other words, the generative model 602 is fine-tuned by using performance of the task network 606 as an objective. That is, the generative model 602 is optimized by minimizing a loss $\mathcal{L}_{task}$ 608 of the task network 606 such that updated parameters φ* of the generative model 602 are calculated as $\phi^* = \arg\min_\phi \mathbb{E}_{x,y\sim LDM(\cdot,\phi)}[\mathcal{L}_{task}(T(x, \theta), y)]$, where the argmin function obtains the minimum value, and $\mathbb{E}$ is the expected value.

FIG. 7 illustrates pseudocode for generative data augmentation with task loss guided fine-tuning, in accordance with various aspects of the present disclosure. In the example of FIG. 7, the input is an image x, a class y, a derived text prompt p (e.g., a clear image of the class), a pretrained generative model (e.g., an LDM), and a hyperparameter T of the generative model (e.g., a number of diffusion steps), which is not the same as the task network T.

The generative model (e.g., LDM) is trained in a first section 700 of the pseudocode. For example, an image x is encoded into a latent variable (z_img) and a text prompt p is encoded into a feature vector (z_text). For every training step of T iterations, the process samples uniformly a time step of interest between zero and the iteration T. During the sampling, noise is introduced to corrupt the latents, obtaining a noisy version of the latents (z_noisy). The added noise (noise_pred) is then predicted by a denoiser of the generative model. Finally, the loss of the generative model (LDM-_loss) is obtained based on a mean square error (MSE) of the predicted noise and the actual noise.

Calculating task network loss in section 750 of the pseudocode will now be discussed. First, denoised latents (z_denoised) are obtained based on a generative model noise scheduler (LDM.noise_scheduler), which takes as inputs the noisy version of the latents (z_noisy) and the predicted added noise (noise_pred) at each time step t. A reconstructed image x' is obtained and fed into the task network T. Predictions (e.g., labels) y' are collected from the task network T. Cross-entropy is then optimized with respect to the predictions y' and ground truth labels y. The task loss depends on the task network T and may be used to fine-tune the generative model. That is, the task loss is added into training of the generative model such that the task network is intervening in the fine-tuning of the generative model. As a result, the generative model is able to generate data that is more useful for the task network.

Figure 8:
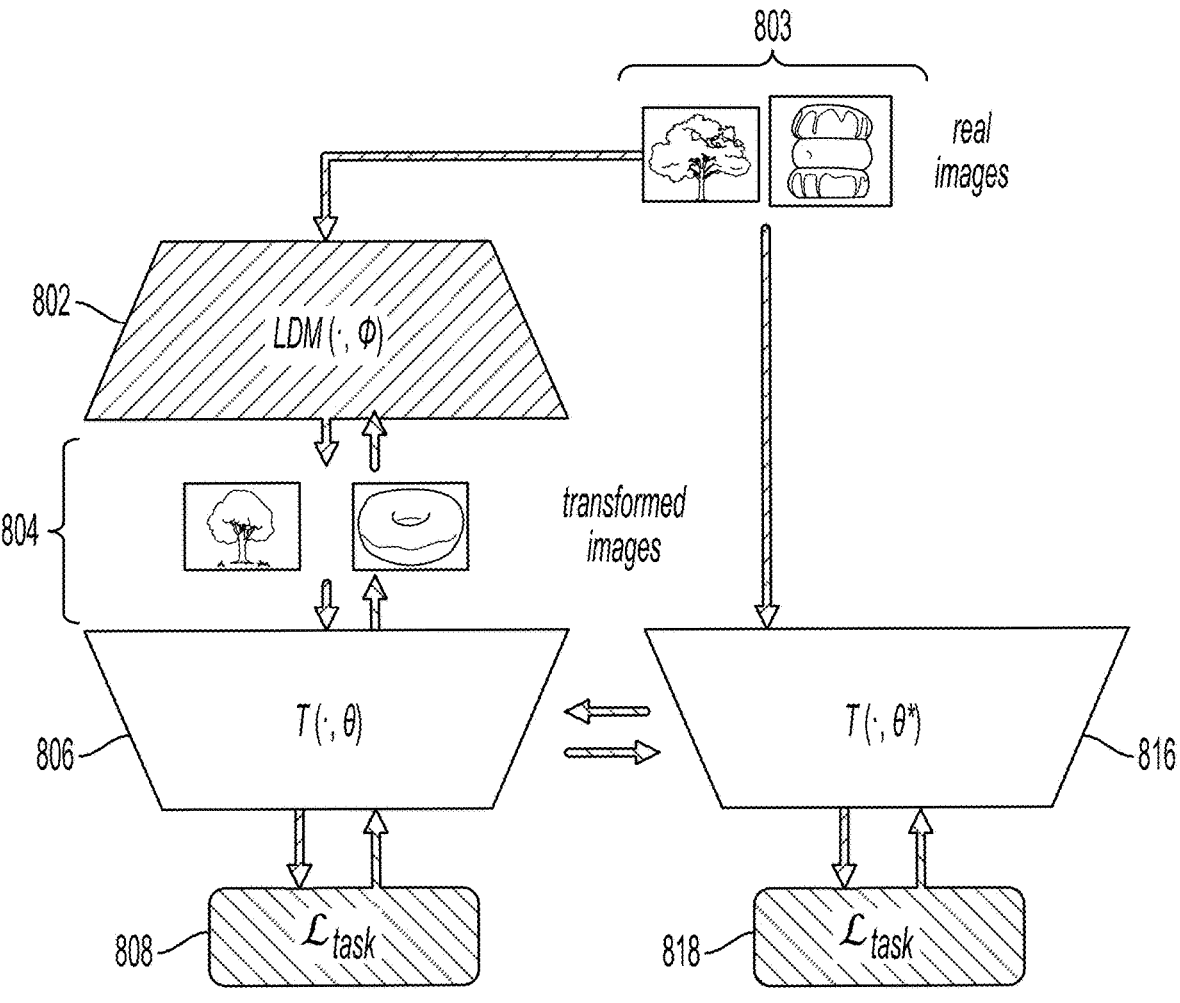
FIG. 8 is a block diagram illustrating an example of augmentation learning, in accordance with various aspects of the present disclosure.

In further aspects of the present disclosure, augmentation learning is performed. In these aspects, how well the generated data improves the task network on real data is considered. FIG. 8 is a block diagram illustrating an example of augmentation learning, in accordance with various aspects of the present disclosure. In augmentation learning, a generative model (e.g., an LDM) 802, having a set of model parameters φ, receives a sample batch of real images as input data 803. The input data 803 does not include text, in contrast to the techniques discussed with respect to the FIGS. 6 and 7. The sample batch of input data 803 is referred to as $x_r$, Y~$D_{real}$. The generative model 802 augments the input data 803 to obtain synthetic data 804, referred to as $x_a$~LDM($x_r$, φ), where $x_a$ represents the augmented images (or synthetic data 804). The synthetic data 804 preserves the semantics of the class of the input data 803. In other words, another example of the same class is provided in the synthetic data 804. In some implementations, the depth and/or edges are also preserved during the augmentation.

A task network 806, with parameters (e.g., weights) θ, receives the synthetic data 804. A gradient results from executing the task network 806 on the synthetic data 804. In other words, a first task loss $\mathcal{L}_{task}$ 808 is obtained. Stochastic gradient descent is performed on the task network 806 with the first task loss $\mathcal{L}_{task}$ 808 based on the augmented images (e.g., synthetic data 804) to obtain updated parameters (e.g., weights) θ* for the task network 806, resulting in an updated (or new) task network 816. The updated parameters θ* are calculated as $\theta^* = \theta - \lambda \nabla_\theta \mathcal{L}_{task}(T(x_a, \theta), y)$, where λ is a learning rate applied to perform a gradient step.

A second task loss $\mathcal{L}_{task}$ 818 is then computed for the updated task network 816 based on the real images (e.g., input data 803). The second task loss $\mathcal{L}_{task}$ 818 is back propagated to the generative model 802 to obtain updated parameters $\phi^* = \arg\min_\phi \mathcal{L}_{task}(T(x_r, \theta^*), y)$ for an updated generative model. The updated generative model transforms real images (e.g., input data 803) into improved synthetic data to provide improved gradients for the task network parameters. This process repeats until performance on the real images is sufficiently improved.

Figure 9:
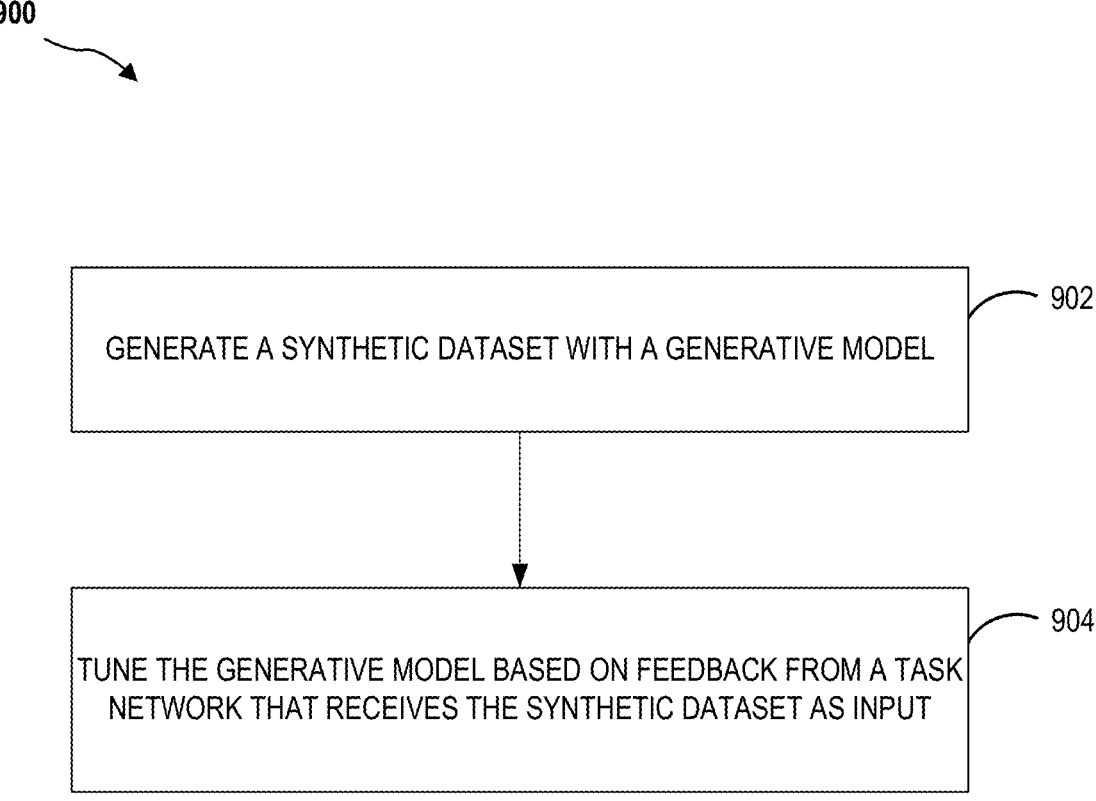
FIG. 9 is a flow diagram illustrating an example of a process for operating a neural network, in accordance with various aspects of the present disclosure.

FIG. 9 is a flow diagram illustrating an example of a process 900 for generative data augmentation with task loss guided fine-tuning, in accordance with various aspects of the present disclosure. The process 900 may be performed by an apparatus to execute the augmentation learning processes described above with respect to FIGS. 6 and 8. As shown in FIG. 9, in some aspects, the process 900 may include generating a synthetic dataset with a generative model (block 902). For example, the synthetic dataset may be generated based on a set of classes and labels of the classes. In some aspects, the process 900 may include tuning the generative model based on feedback from a task network that receives the synthetic dataset as input (block 904). For example, the task network may perform image recognition. In some aspects, the method may iteratively generate the synthetic dataset and tune the generative model, based on feedback from the task network.

Example Aspects

Aspect 1: An apparatus, comprising: at least one memory storing instructions; and at least one processor coupled to the at least one memory and configured to instruct the apparatus to: generate a synthetic dataset with a generative model; and tune the generative model based on feedback from a task network that receives the synthetic dataset as input.

Aspect 2: The apparatus of Aspect 1, in which the task network performs image recognition.

Aspect 3: The apparatus of Aspect 1 or 2, in which the at least one processor is further configured to instruct the apparatus to iteratively generate the synthetic dataset and tune the generative model, based on feedback from the task network.

Aspect 4: The apparatus of any of the preceding Aspects, in which the at least one processor is further configured to instruct the apparatus to: obtain a prediction, with task network, based on the synthetic dataset; calculate a loss of the task network based on the prediction from the synthetic dataset; back propagate the loss of the task network to the generative model; tune the generative model by reducing the loss of the task network to obtain a tuned generative model; and generate an updated synthetic dataset with the tuned generative model.

Aspect 5: The apparatus of any of the preceding Aspects, in which the synthetic dataset is generated based on a set of classes and labels of the classes.

Aspect 6: The apparatus of any of the preceding Aspects, in which the at least one processor is further configured to instruct the apparatus to retrain the task network based on the updated synthetic dataset.

Aspect 7: The apparatus of any of the preceding Aspects, in which the at least one processor is further configured to instruct the apparatus to: generate a synthetic dataset with a generative model based on a set of real images; obtain a first prediction, with the task network, based on the synthetic dataset; calculate a loss of the task network based on the first prediction from the synthetic dataset; update the task network based on the loss of the network to obtain an updated task network; calculate a loss of the updated task network based on a second prediction of the updated task network and the set of real images; back propagate the loss of the updated task network to the generative model; tune the generative model by reducing the loss of the updated task network to obtain a tuned generative model; and generate an updated synthetic dataset with the tuned generative model.

Aspect 8: A method, comprising: generating a synthetic dataset with a generative model; and tuning the generative model based on feedback from a task network that receives the synthetic dataset as input.

Aspect 9: The method of Aspect 8, in which the task network performs image recognition.

Aspect 10: The method of Aspect 8 or 9, further comprising iteratively generating the synthetic dataset and tuning the generative model, based on feedback from the task network.

Aspect 11: The method of any of the Aspects 8-10, further comprising: obtaining a prediction, with task network, based on the synthetic dataset; calculating a loss of the task network based on the prediction from the synthetic dataset; back propagating the loss of the task network to the generative model; tuning the generative model by reducing the loss of the task network to obtain a tuned generative model; and generating an updated synthetic dataset with the tuned generative model.

Aspect 12: The method of any of the Aspects 8-11, in which the synthetic dataset is generated based on a set of classes and labels of the classes.

Aspect 13: The method of any of the Aspects 8-12, further comprising retraining the task network based on the updated synthetic dataset.

Aspect 14: The method of any of the Aspects 8-13, further comprising: generating a synthetic dataset with a generative model based on a set of real images; obtaining a first prediction, with the task network, based on the synthetic dataset; calculating a loss of the task network based on the first prediction from the synthetic dataset; updating the task network based on the loss of the network to obtain an updated task network; calculating a loss of the updated task network based on a second prediction of the updated task network and the set of real images; back propagating the loss of the updated task network to the generative model; tuning the generative model by reducing the loss of the updated task network to obtain a tuned generative model; and generating an updated synthetic dataset with the tuned generative model.

Aspect 15: A non-transitory computer-readable medium having program code recorded thereon, the program code executed by a processor and comprising: program code to generate a synthetic dataset with a generative model; and program code to tune the generative model based on feedback from a task network that receives the synthetic dataset as input.

Aspect 16: The non-transitory computer-readable medium of Aspect 15, in which the task network performs image recognition.

Aspect 17: The non-transitory computer-readable medium of Aspect 15 or 16, in which the program code comprises program code to iteratively generate the synthetic dataset and tune the generative model, based on feedback from the task network.

Aspect 18: The non-transitory computer-readable medium of any of the Aspects 15-17, in which the program code comprises: program code to obtain a prediction, with task network, based on the synthetic dataset; program code to calculate a loss of the task network based on the prediction from the synthetic dataset; program code to back propagate the loss of the task network to the generative model; program code to tune the generative model by reducing the loss of the task network to obtain a tuned generative model; and program code to generate an updated synthetic dataset with the tuned generative model.

Aspect 19: The non-transitory computer-readable medium of any of the Aspects 15-18, in which the synthetic dataset is generated based on a set of classes and labels of the classes.

Aspect 20: The non-transitory computer-readable medium of any of the Aspects 15-19, in which the program code comprises program code to retrain the task network based on the updated synthetic dataset.

Aspect 21: The non-transitory computer-readable medium of any of the Aspects 15-20, in which the program code comprises: program code to generate a synthetic dataset with a generative model based on a set of real images; program code to obtain a first prediction, with the task network, based on the synthetic dataset; program code to calculate a loss of the task network based on the first prediction from the synthetic dataset; program code to update the task network based on the loss of the network to obtain an updated task network; program code to calculate a loss of the updated task network based on a second prediction of the updated task network and the set of real images; program code to back propagate the loss of the updated task network to the generative model; program code to tune the generative model by reducing the loss of the updated task network to obtain a tuned generative model; and program code to generate an updated synthetic dataset with the tuned generative model.

Aspect 22: An apparatus, comprising: means for generating a synthetic dataset with a generative model; and means for tuning the generative model based on feedback from a task network that receives the synthetic dataset as input.

Aspect 23: The apparatus of Aspect 22, in which the task network performs image recognition.

Aspect 24: The apparatus of Aspect 22 or 23, further comprising means for iteratively generating the synthetic dataset and means for tuning the generative model, based on feedback from the task network.

Aspect 25: The apparatus of any of the Aspects 22-24, further comprising: means for obtaining a prediction, with task network, based on the synthetic dataset; means for calculating a loss of the task network based on the prediction from the synthetic dataset; means for back propagating the loss of the task network to the generative model; means for tuning the generative model by reducing the loss of the task network to obtain a tuned generative model; and means for generating an updated synthetic dataset with the tuned generative model.

Aspect 26: The apparatus of any of the Aspects 22-25, in which the synthetic dataset is generated based on a set of classes and labels of the classes.

Aspect 27: The apparatus of any of the Aspects 22-26, further comprising means for retraining the task network based on the updated synthetic dataset.

Aspect 28: The apparatus of any of the Aspects 22-27, further comprising: means for generating a synthetic dataset with a generative model based on a set of real images; means for obtaining a first prediction, with the task network, based on the synthetic dataset; means for calculating a loss of the task network based on the first prediction from the synthetic dataset; means for updating the task network based on the loss of the network to obtain an updated task network; means for calculating a loss of the updated task network based on a second prediction of the updated task network and the set of real images; means for back propagating the loss of the updated task network to the generative model; means for tuning the generative model by reducing the loss of the updated task network to obtain a tuned generative model; and means for generating an updated synthetic dataset with the tuned generative model.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An apparatus, comprising:
   at least one memory storing instructions; and
   at least one processor coupled to the at least one memory and configured to instruct the apparatus to:
       generate a synthetic dataset with a generative model;
       obtain a prediction, with a task network, based on the synthetic dataset;
       calculate a loss of the task network based on the prediction from the synthetic dataset;

back propagate the loss of the task network to the generative model instead of a task model;

tune the generative model by reducing the loss of the task network to obtain a tuned generative model; and generate an updated synthetic dataset with the tuned generative model.

2. The apparatus of claim 1, in which the task network performs image recognition.

3. The apparatus of claim 1, in which the at least one processor is further configured to instruct the apparatus to iteratively generate the synthetic dataset and tune the generative model, based on feedback from the task network.

4. The apparatus of claim 1, in which the synthetic dataset is generated based on a set of classes and labels of the classes.

5. The apparatus of claim 1, in which the at least one processor is further configured to instruct the apparatus to retrain the task network based on the updated synthetic dataset.

6. A method, comprising:

generating a synthetic dataset with a generative model based on a set of real images;

obtaining a first prediction, with a task network, based on the synthetic dataset;

calculating a first loss of the task network based on the first prediction from the synthetic dataset;

updating the task network based on the first loss of the task network to obtain an updated task network;

calculating a second loss of the updated task network based on a second prediction of the updated task network and the set of real images;

back propagating the second loss of the updated task network to the generative model;

tuning the generative model by reducing the loss of the updated task network to obtain a tuned generative model; and generating an updated synthetic dataset with the tuned generative model.

7. The method of claim 6, in which the task network performs image recognition.

8. The method of claim 6, further comprising iteratively generating the synthetic dataset and tuning the generative model, based on feedback from the task network.

9. A non-transitory computer-readable medium having program code recorded thereon, the program code executed by a processor and comprising:

program code to generate a synthetic dataset with a generative model;

program code to obtain a prediction, with a task network, based on the synthetic dataset;

program code to calculate a loss of the task network based on the prediction from the synthetic dataset;

program code to back propagate the loss of the task network to the generative model instead of a task model;

program code to tune the generative model by reducing the loss of the task network to obtain a tuned generative model; and program code to generate an updated synthetic dataset with the tuned generative model.

10. The non-transitory computer-readable medium of claim 9, in which the task network performs image recognition.

11. The non-transitory computer-readable medium of claim 9, in which the program code comprises program code to iteratively generate the synthetic dataset and tune the generative model, based on feedback from the task network.

12. The non-transitory computer-readable medium of claim 9, in which the synthetic dataset is generated based on a set of classes and labels of the classes.

13. The non-transitory computer-readable medium of claim 9, in which the program code comprises program code to retrain the task network based on the updated synthetic dataset.

14. An apparatus, comprising:

means for generating a synthetic dataset with a generative model based on a set of real images;

means for obtaining a first prediction, with the task network, based on the synthetic dataset;

means for calculating a first loss of the task network based on the first prediction from the synthetic dataset;

means for updating the task network based on the first loss of the task network to obtain an updated task network;

means for calculating a second loss of the updated task network based on a second prediction of the updated task network and the set of real images;

means for back propagating the second loss of the updated task network to the generative model;

means for tuning the generative model by reducing the loss of the updated task network to obtain a tuned generative model; and means for generating an updated synthetic dataset with the tuned generative model.

15. The apparatus of claim 14, in which the task network performs image recognition.

16. The apparatus of claim 14, further comprising means for iteratively generating the synthetic dataset and means for tuning the generative model, based on feedback from the task network.

* * * * *